F. G. UNDERWOOD.
VAPORIZER AND CARBURETER.
APPLICATION FILED SEPT. 3, 1913.
1,088,749.
Patented Mar. 3, 1914.
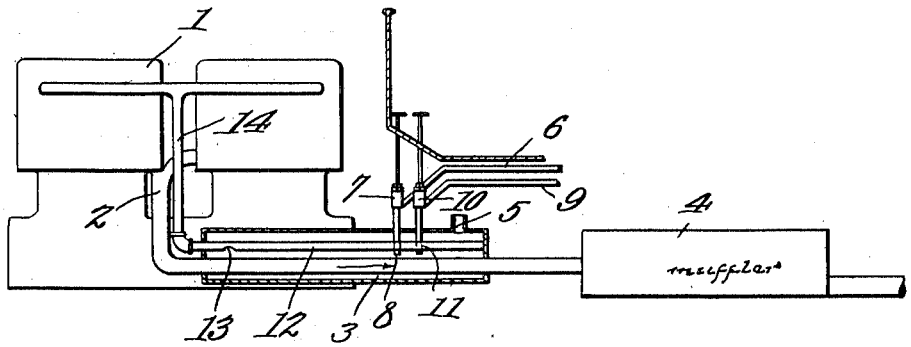
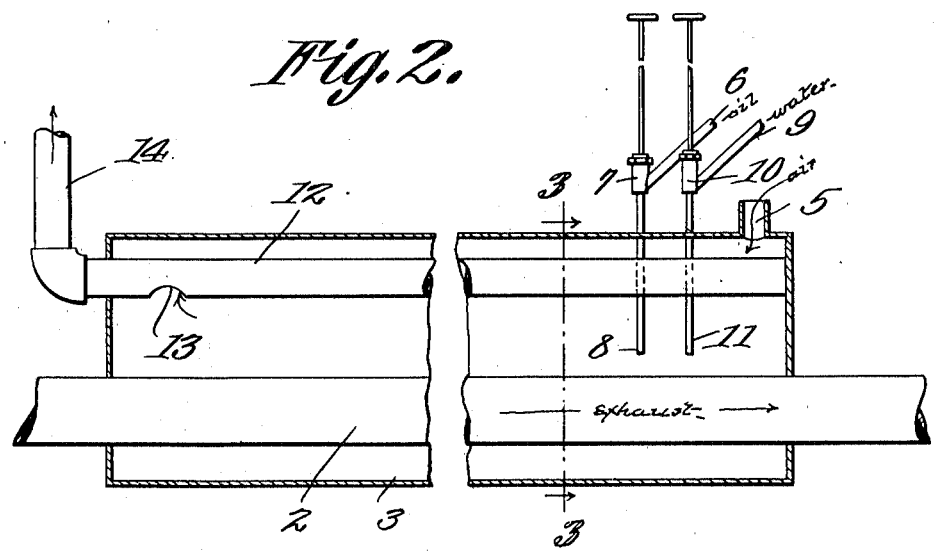
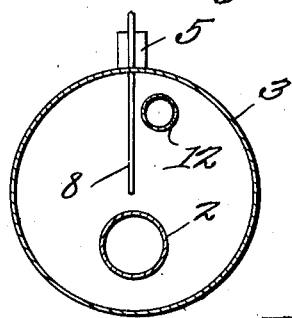
Witnesses
F. G. Underwood
Inventor,
by C. A. Snow & Co.
Attorneys

UNITED STATES PATENT OFFICE.

FRANK G. UNDERWOOD, OF DEADWOOD, SOUTH DAKOTA, ASSIGNOR OF ONE-FOURTH TO JENS THOMAS JENSEN, OF DEADWOOD, SOUTH DAKOTA.

VAPORIZER AND CARBURETER.

1,088,749. Specification of Letters Patent. Patented Mar. 3, 1914.

Application filed September 3, 1913. Serial No. 788,028.

*To all whom it may concern:*

Be it known that I, FRANK G. UNDERWOOD, a citizen of the United States, residing at Deadwood, in the county of Lawrence and State of South Dakota, have invented a new and useful Vaporizer and Carbureter, of which the following is a specification.

The present invention relates to improvements in vaporizers and carbureters, one object of the invention being the provision of means whereby the liquid fuel is properly vaporized as is also water to commingle with the volatilized fuel and air, to produce a thoroughly mixed carbureted air before the same is introduced into the explosion chambers of an engine.

A further object of the invention is the provision of means adapted to be disposed or incased about a portion of the exhaust manifold of an explosion engine, and constituting a mixing chamber for the liquid and air, an accelerating fluid in the form of water converted into a steam being used in conjunction therewith, so that a properly mixed carbureted air is supplied to the explosion chambers of the engine.

A still further object of the present invention is the provision of means whereby the supply of the fuel and water to the mixing chamber may be regulated to produce a carbureted air of the best proportions.

With the foregoing and other objects in view which will appear as the description proceeds, the invention resides in the combination and arrangement of parts and in the details of construction hereinafter described and claimed, it being understood that changes in the precise embodiment of the invention herein disclosed can be made within the scope of what is claimed without departing from the spirit of the invention.

In the drawings: Figure 1 is a diagrammatic view partly in section of the present invention as used in connection with an explosion engine. Fig. 2 is an enlarged detail sectional view of the present invention with portion of the exhaust manifold shown. Fig. 3 is a section taken on line 3—3 of Fig. 2.

Referring to the drawings, the numeral 1 designates an explosion engine, which is here shown indicative of any form or construction thereof, the same being provided with an exhaust manifold 2, which extends through the carbureted air mixing cylinder or chamber 3 to the muffler 4.

The present chamber 3 is shown cylindrical and horizontally disposed, but it is evident that the same may be connected in any manner according to the installation of the explosion engine and the position of the exhaust manifold, it being the intention of the present invention to position the same upon the exhaust manifold of any engine as installed or as presently constructed.

The mixing chamber 3 is provided with the air inlet 5 so that as the carbureted air is drawn into the explosion engine in the usual way through the manifold 14, air will be drawn into the chamber or compartment 3 to be mixed with the volatilized fuel and steam.

A pipe 6 is led from the liquid fuel reservoir (not shown), and is provided with the manually controlled valve 7, which permits the proper supply of the fuel through the nipple or nozzle 8 at a point directly above the exhaust manifold within the mixing chamber 3. A pipe 9 is led from a water reservoir (not shown), so that water may be supplied therethrough and controlled by the valve 10 so that the proper amount is atomized from the nozzle 11 upon the exhaust manifold 2 within the mixing chamber 3.

As the exhaust manifold is heated from the discharged burnt gases from the explosion engine 1, the liquid fuel is immediately vaporized while the water is converted into steam, thus producing with the air entering the port 5, a highly explosive mixture for introduction through the port 13 of the extension 12 of the intake manifold 14 of the explosion engine. The extension 12 of the intake manifold is disposed within the mixing chamber 3, so that the same will be heated from the exhaust manifold 2 within such mixing chamber, and thus insure the delivery through the port 13 and the intake manifold 14 of a properly mixed and heated carbureted air charge. By this means all streaks are eliminated from the mixture and a carbureted air charge with the minimum proportion of fuel which will produce the maximum power is delivered into the explosion chambers of the engine 1.

By means of the valves 7 and 10, the control of the liquids to the mixing chamber 3, may be properly proportioned and if so desired, a butterfly valve or the like may be disposed in the air inlet pipe or port 5.

By using water, less fuel (oil) is found necessary as the hydrogen augments the explosive components of the kerosene oil, or any fluid hydrocarbon, while the oxygen supplies any deficiency that might arise from air not containing the proper amount of oxygen, or what is known as "bad air".

What is claimed is:—

The combination with the exhaust and intake manifolds of an explosion engine, of a vaporizer and carbureter, including a casing, surrounding a portion of the exhaust manifold and having an air inlet port at its upper portion near one end, a carbureted air intake pipe mounted within and near the upper portion of the casing, said pipe having a port in its lower wall within the casing at a point remote from the air port, one end of the pipe being in communication with the intake manifold, a valve controlled explosive liquid directing nozzle mounted in the upper wall of the casing and projecting within the casing below the pipe and terminating directly above and out of contact with the exhaust manifold, and a water directing nozzle mounted in the upper wall of the casing and parallel with the explosive liquid nozzle, whereby the explosive liquid and water are directed upon the exhaust manifold within the casing at points between the air inlet port and the port of the intake pipe.

In testimony that I claim the foregoing as my own, I have hereto affixed my signature in the presence of two witnesses.

FRANK G. UNDERWOOD.

Witnesses:
 CARL E. ANDERSON,
 JENS. T. JENSEN.